Nov. 9, 1937.      A. Y. DODGE ET AL      2,098,377
LUBRICATING DEVICE
Filed May 26, 1934
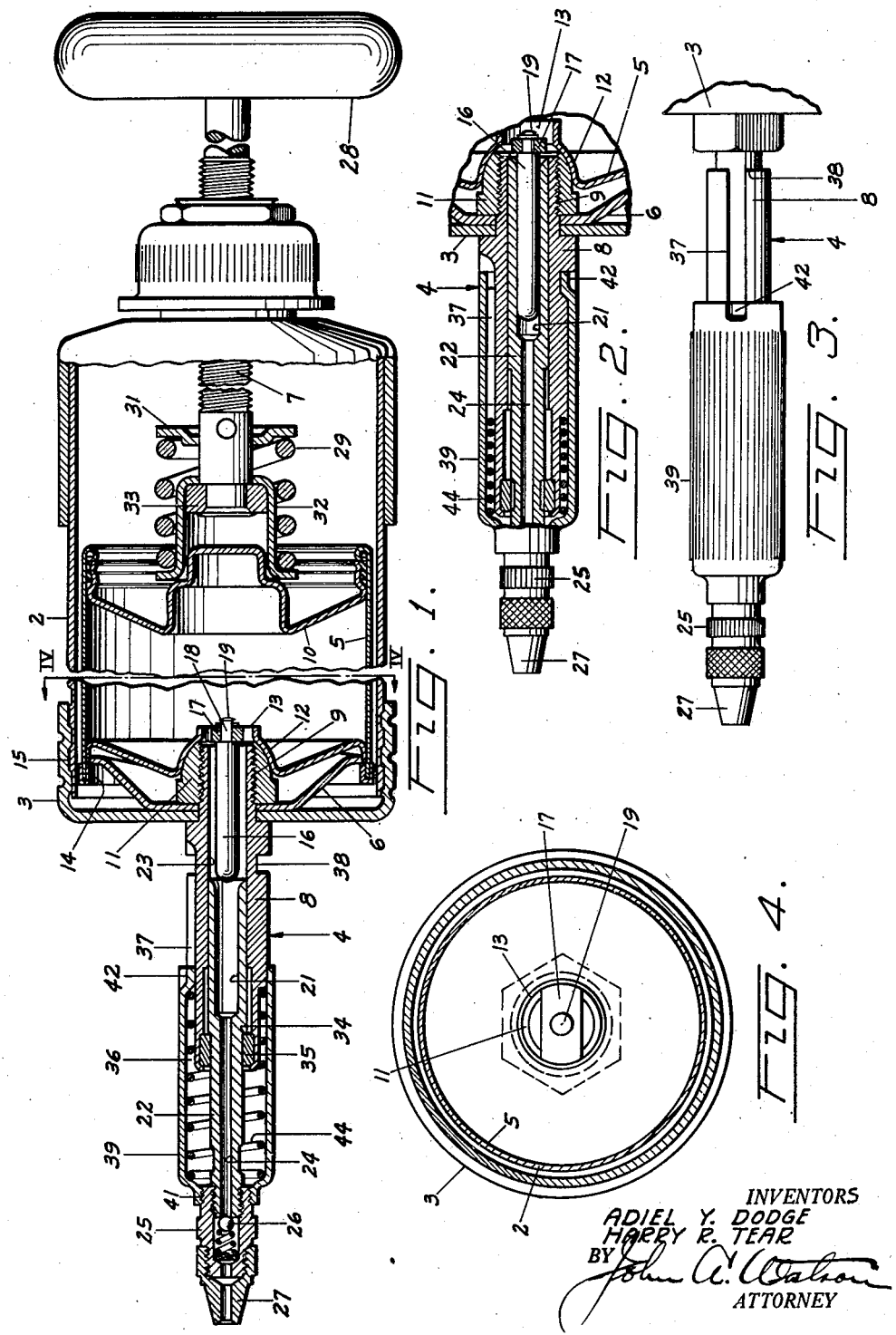
INVENTORS
ADIEL Y. DODGE
HARRY R. TEAR
BY
ATTORNEY Patented Nov. 9, 1937

2,098,377

UNITED STATES PATENT OFFICE 2,098,377

LUBRICATING DEVICE

Adiel Y. Dodge, South Bend, Ind., and Harry R. Tear, Evanston, Ill., assignors to The Lubrication Corporation, South Bend, Ind., a corporation of Delaware Application May 26, 1934, Serial No. 727,604

8 Claims. (Cl. 221—47.4)

This invention relates to improvements in lubricating devices and more particularly to hand operated lubricant guns of the type adapted for use in servicing the lubricant receiving bearings of motor vehicles and machinery.

An object of the invention is to provide a hand operated lubricant gun wherein the lubricant is supplied thereto in interchangeable cartridges forming a part of the gun assembly, and wherein means are provided for establishing, at will, an arrangement of the gun operating parts whereby a minimum amount of lubricant is permitted to remain in the lubricant conducting spaces and passageways of the gun, between the cartridge outlet opening and the discharge nozzle of the gun, as during the interchange of cartridges. This feature is one of particular importance in the application of the lubricant gun to routine automotive lubricant servicing where various grades of lubricant are required. For this purpose several cartridges may be provided each containing one of the lubricants required, whereupon the operator may exchange one cartridge for another of the group during the servicing operation. The minimum lubricant retaining capacity of the spaces and passageways of the gun, as described, assures quick change in the nature of the lubricant discharge from the nozzle to that of the newly installed cartridge.

Another object is to provide a lubricant gun of the character described which is primarily a pressure feed high pressure lubricant gun but which may be used as a low pressure feed gun such as for the filling of lubricant reservoirs or cavities as in universal joints and stearing gears.

A further object is to provide a lubricant gun of the character described having a self-aligning high pressure piston thereby assuring minimum friction and wear during operation of the gun.

A further object is to provide a lubricant gun of the character described having a high pressure pump unit so arranged with respect to the interchangeable lubricant supply cartridge that the inlet orifice of the pump lies within the walls of the outlet opening of the cartridge thus providing minimum resistance of the passage of lubricant from the cartridge into the high pressure pump.

Other objects, the advantages and uses of the invention will be, or should become, apparent after reading the following specification and claims and after consideration of the drawing forming a part of this specification wherein:

Fig. 1 is a sectional view of a lubricant gun constructed in accordance with the invention;

Fig. 2 is a view partially in section of the high pressure pump unit of the mechanism of the gun of Fig. 1 as it appears at the end of its pressure stroke;

Fig. 3 is a fragmentary side elevation of the high pressure pump unit; and

Fig. 4 is a sectional view along the line IV—IV of Fig. 1.

In general the lubricant gun selected for illustration herein comprises a cylindrical barrel 2 having a screw threaded cap 3 at its forward end upon which the high pressure pump unit 4 of the gun is mounted, an interchangeable lubricant cartridge 5 detachably secured to the cap and high pressure pump unit assembly through the medium of the cartridge connector plate 6 and a hand operated feed screw 7 extending through the rearward end of the barrel 2 for urging the cartridge piston 10 inwardly of the cartridge to discharge lubricant from the cartridge into the high pressure pump unit 4.

With reference to Fig. 1, the high pressure pump unit 4 comprises a tubular body 8 having a reduced and externally threaded portion 9 which extends through a central opening in the cap 3 and is fixed to the cap by the disposition of an internally threaded cartridge connector stud 11 in the manner shown. The cartridge connector plate 6 may be interposed between the connector stud 11 and the inner wall of the cap 3 thereby to maintain the pump body 8, the cap 3, the connector plate 6 and the connector stud 11, all in predetermined fixed relationship one with the other. In the gun illustrated the external wall of the connector stud 11 is spherical in contour and is engageable with the complementary wall structure 12 of the cartridge outlet opening 13 thereby to provide a universal sealing contact between the cartridge outlet and the cartridge connector stud. The cartridge connector plate is adapted to engage at its periphery with inwardly extending bayonet lugs 14 formed on the cartridge side wall thereby to draw the cartridge into close engagement with the connector stud and mechanically to support the cartridge upon the cap and high pressure pump unit assembly. During the attachment and detachment of the cartridge to and from the cap assembly, the barrel 2 may be removed, suitable screw threads 15 being provided on the adjacent cap and barrel walls therefor. This simple arrangement provides maximum accessibility to the cartridge mounting structure so that there is little danger that an operator may effect incomplete attachment of the cartridge.

The high pressure piston 10 of the pump unit 4 is of the stationary type and may be mounted upon a bridge 17 (see Fig. 4) extending transversely across the innermost end of the cartridge connector stud 11. We prefer loosely to mount the piston 10 upon the bridge 17 and to this end a pin 18 is passed through an opening in the bridge 17 and fixed to the inner end of the piston 10, there being sufficient clearance between the side walls of the pin and the said opening to permit the piston to shift an amount sufficient to assure of its proper alignment within the cylinder 21 of a plunger 22 mounted for reciprocation within the bore 23 of the tubular body 8.

The plunger 22 comprises the movable element of the high pressure pump unit 4 and is provided with a relatively small bore 24 extending to the forward end thereof and is in communication, at its rearward end, with the high pressure cylinder 21. A nipple 25 secured to the forward end of the plunger 24 serves as a housing for an outlet check valve 26, of the spring pressed ball type, and as a support for an interchangeable discharge nozzle 27 anterior of the check valve 26. Relative movement of the plunger 22 and piston 10 toward one another from the position illustrated in Fig. 1 to the position illustrated in Fig. 2 will cause the displacement of lubricant from within the cylinder 21 outwardly through the plunger and the discharge nozzle 27. During the normal operation of the gun the entire barrel assembly is moved forwardly toward a lubricant fitting (not shown) with which the nozzle 27 may be engaged. The plunger 22 remains stationary.

Lubricant is supplied to the cylinder 21 through the bore 23 of the pump body 8 by the application of pressure upon the cartridge piston 10 through the medium of the feed screw 7, the feed screw being provided with a manually engageable hand grip 28 to facilitate turning of the screw. We prefer to interpose a compression spring 29 between the inner end of the feed screw 7 and piston 10, thereby to compress the spring and place the piston 10 under the influence of the spring so that lubricant will continue to flow into the bore 23 of the high pressure pump unit during several successive suction strokes of the pump.

The spring 29 may rest at one end upon a washer 31 fixed relatively to the screw 7 and at its opposite end upon a flanged cup 32 having an opening centrally thereof through which the inner end of the screw may extend. A head 33 may be fixed to the inner end of the screw within the cup 32 to prevent dislodgment of the cup from the screw under force of the spring when the screw 7 is returned.

In order to limit movement of the plunger 22 forwardly of the piston 10, a shoulder 34 may be formed on the outer wall of the plunger which is engageable with a bushing 35 fixed within the mouth of an enlarged portion 36 of the bore 23. This arrangement of plunger stop possesses the added advantage of permitting the bore 23 of the pump unit to be broached during the course of manufacture thereby to reduce and simplify manufacturing expense and to attain accuracy in dimensions.

The outer wall of the pump body 8 may be provided with a longitudinally extending groove 37 communicating at its inner end with an annular groove 38 of substantially equal width and depth. A sleeve 39 secured at its forward end as shown at 41 to the nipple 25 is fashioned of sufficient length to cause its rearward end to overlie the groove 38 whereby an inwardly extending lug 42 formed at the inner end of the sleeve may slide within the groove 37 to maintain the plunger assembly against rotation relative to the balance of the gun mechanism and to ride within the groove 38 by rotation of the sleeve and plunger when the status of the pump unit is that illustrated in Fig. 2, i. e., at the end of the pressure stroke of the pump. Engagement of the lug 42 with the grooved portion 38 of the body serves to retain the parts in the position illustrated in Fig. 2 thereby to present, at will, the elements of the gun in such a condition as to provide minimum lubricant conducting space and passageway between the cartridge outlet 13 and the nozzle 27. It is contemplated that the gun shall be so adjusted whenever a cartridge is to be removed and replaced with another.

After an interchange of cartridges under the condition above described a single discharge stroke of the high pressure pump will be sufficient to discharge through the nozzle 27 all of the lubricant remaining in the gun supplied by the former cartridge. This advantage we consider of great importance where the gun is to be used as primarily intended for the servicing of motor vehicles requiring several grades of lubricant for the several species of bearings upon the vehicle.

Upon the rotation of the sleeve 39 from the position shown in Fig. 2, the lug 42 may again register and fall within the groove 37 whereupon a compression spring 44 mounted within the sleeve 39 between the pump body 8 and outer end of the sleeve will cause the pump parts to assume the positions shown in Fig. 1. The spring 44 otherwise serves to urge the pump parts to the position shown in Fig. 1 subsequent to each pressure stroke of the pump.

While we do not intend that the lubricant gun shall be used to service a lubricant receiving fitting through the sole application of pressure to the cartridge piston 10, the gun may be used to dispense lubricant into lubricant receiving cavities such as in universal joints and stearing gears by turning the feed screw 7 with the plunger 22 fully extended. The gun, therefore, possesses the added utility of a low pressure dispenser.

We claim:

1. A lubricating device comprising, in unit assembly, a high pressure pump having a piston, a low pressure lubricant supply source for said pump including an interchangeable lubricant supply cartridge having a discharge outlet and quick detachable means to secure said cartridge to the pump with its outlet in communication with the pump inlet, means adapted to be moved into operative relationship with said cartridge for placing the lubricant in said cartridge under low pressure, and means operable at will for retaining the pump parts in such relationship as to provide minimum lubricant space between the cartridge outlet and the discharge port of the pump from which lubricant may be discharged during the immediately succeeding pump cycle, said space being less than the displacement of said pump piston.

2. In a lubricating device, a high pressure pump unit having a piston, an interchangeable cartridge having an outlet, means for detachably mounting said cartridge upon said pump with one end of said pump piston located within the confines of said cartridge outlet, and means adapted to be moved into operative relationship with said cartridge for placing the lubricant in said cartridge under low pressure.

3. In a lubricating device, a high pressure lubricant pump comprising, a tubular body member, a piston located within said tubular member and secured against longitudinal movement therein, a plunger mounted for relative longitudinal movement within the bore of said tubular member, said plunger having a cylinder for receiving said piston upon relative movement between the tubular member and the plunger, a discharge nozzle fixed with respect to the plunger and communicating with said cylinder, a sleeve fixed at one end upon said plunger and telescopically mounted over said tubular member, and means associated with said sleeve and with said tubular member for locking the plunger against longitudinal movement when said piston is in a position of maximum displacement with respect to the lubricant in said cylinder.

4. In a lubricating device, a high pressure lubricant pump comprising, a tubular body member, a piston located within said tubular member and secured against longitudinal movement therein, a plunger mounted for relative longitudinal movement within the bore of and with respect to said tubular member, said plunger having a cylinder for receiving said piston upon relative movement between the tubular member and the plunger, a discharge nozzle fixed with respect to the plunger and communicating with said cylinder, a sleeve fixed at one end upon said plunger and telescopically mounted over said tubular member, means associated with said sleeve and with said tubular member for locking the plunger against longitudinal movement when said piston is in a position of maximum displacement with respect to the lubricant in said cylinder, and a cartridge connector stud encompassing the rearward end of said tubular body member, said stud providing a sealing means adapted to cooperate with an interchangeable lubricant cartridge to provide a lubricant seal between the inlet of the pump and said cartridge, and providing a support for said pump piston.

5. A lubricating device comprising a lubricant cartridge having an outlet, a lubricant pump including relatively axially moving parts and having an inlet at one end, means for detachably securing the pump to the cartridge with the pump inlet in communication with the cartridge outlet, and means to lock the pump parts in discharge position to provide minimum lubricant space between the pump inlet and outlet.

6. A lubricating device comprising a lubricant cartridge having an outlet, a lubricant pump including relatively axially moving parts and having an inlet at one end, means for detachably securing the pump to the cartridge with the pump inlet in communication with the cartridge outlet, said pump parts including means operable upon relative rotation thereof to lock said parts in discharge position.

7. A lubricating device comprising a lubricant cartridge having an outlet, a lubricant pump including relatively axially moving parts and having an inlet at one end, means for detachably securing the pump to the cartridge with the pump inlet in communication with the cartridge outlet, one of said pump parts comprising coaxial members providing an annular space therebetween, a cylindrical sleeve in said space, and cooperating means on the outer pump part and the sleeve to lock the pump in discharge position.

8. In a lubricating device, a high pressure pump unit having a piston, an interchangeable lubricant cartridge having an outlet, means for detachably mounting said cartridge upon said pump with one end of said pump piston located within the confines of the cartridge outlet, and means for locking said pump unit in a position with the piston in its discharge position.

ADIEL Y. DODGE.
HARRY R. TEAR.